F. J. GOSMEYER.
POTATO PLANTER.
APPLICATION FILED SEPT. 14, 1914.
1,189,358.
Patented July 4, 1916.
3 SHEETS—SHEET 1.
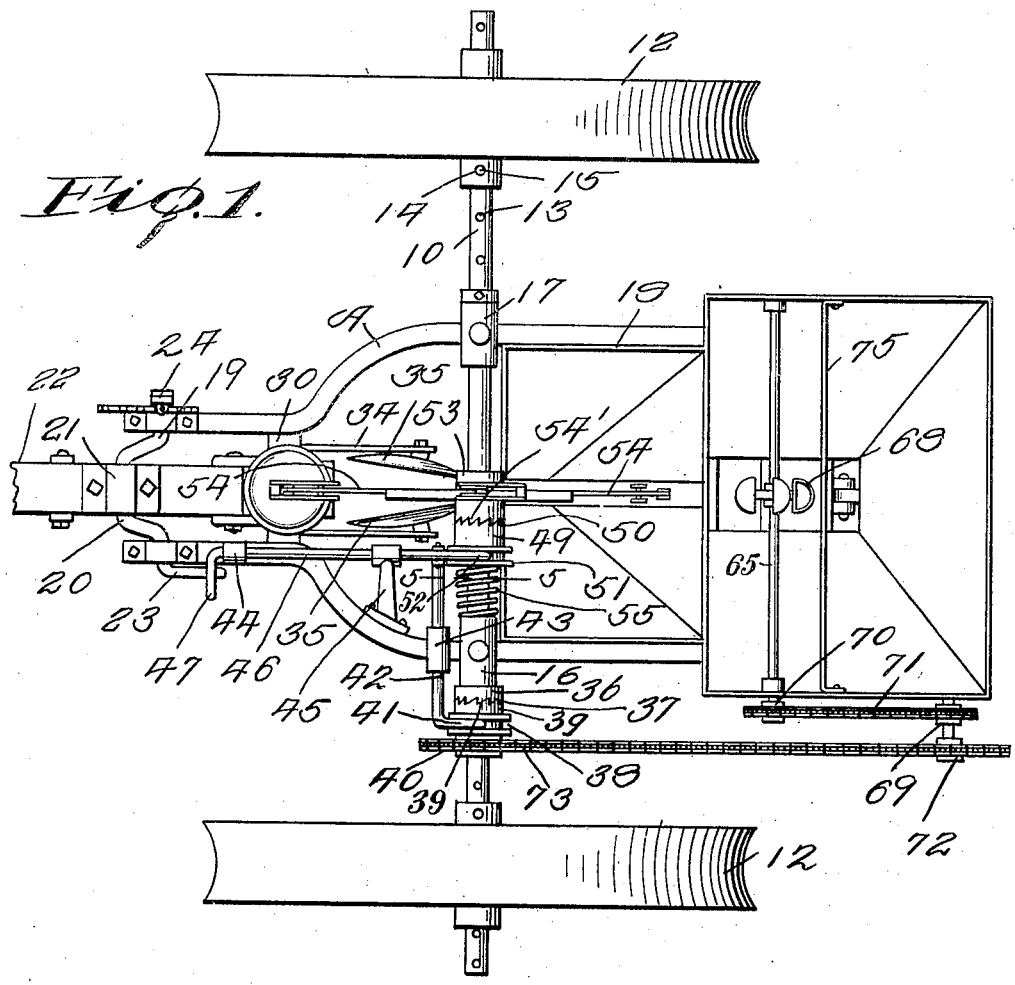
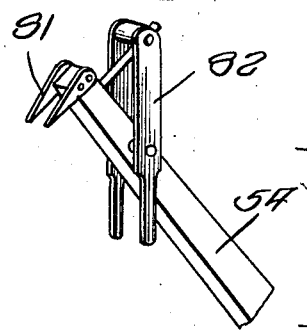
Witnesses
B. S. Brown
A. Ellison
Inventor
F. J. Gosmeyer
By Chandler & Chandler
Attorneys

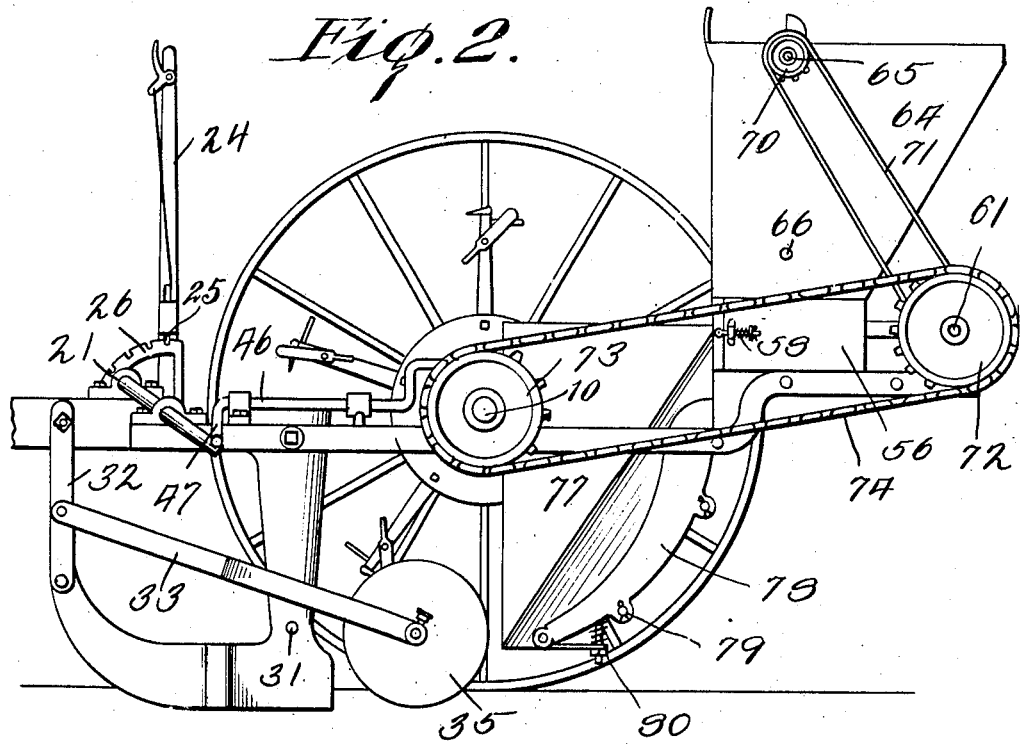

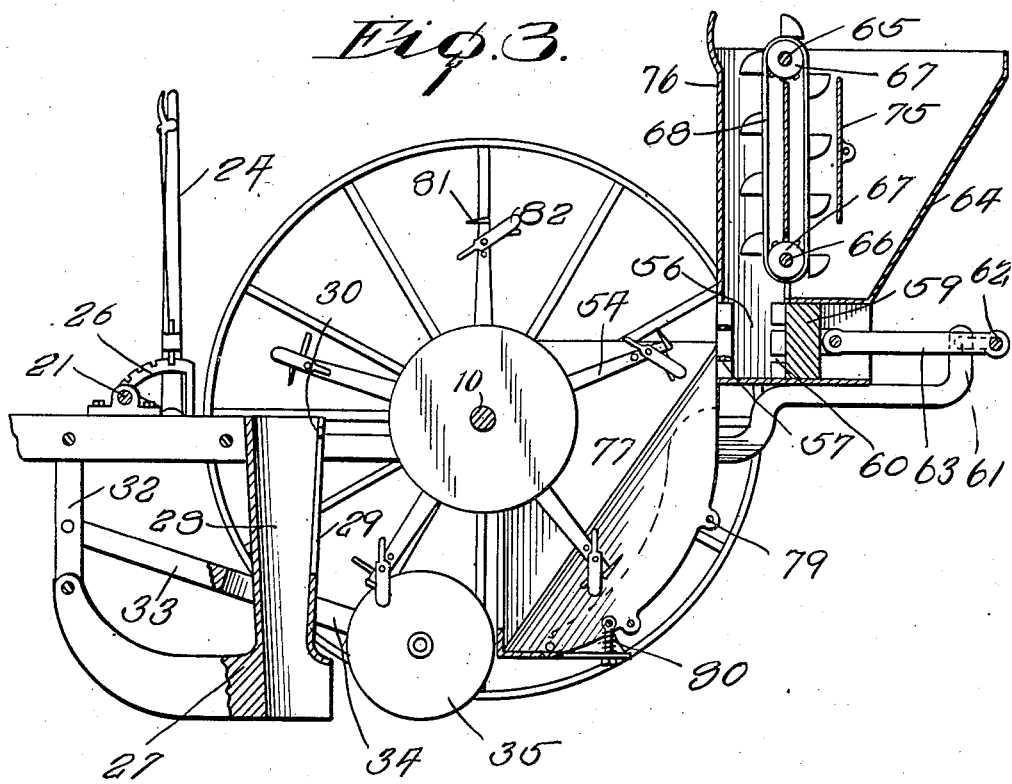
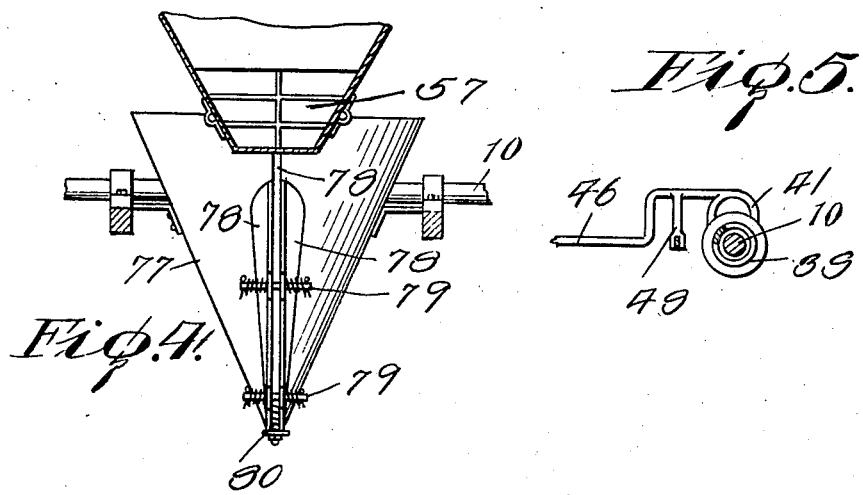

UNITED STATES PATENT OFFICE.

FRANK J. GOSMEYER, OF CLEARWATER, MINNESOTA.

POTATO-PLANTER.

1,189,358. Specification of Letters Patent. Patented July 4, 1916.

Application filed September 14, 1914. Serial No. 861,674.

*To all whom it may concern:*

Be it known that I, FRANK J. GOSMEYER, a citizen of the United States, residing at Clearwater, in the county of Wright, State of Minnesota, have invented certain new and useful Improvements in Potato-Planters; and I do hereby declare the following to be a full, clear, and exact description of the invention, such as will enable others skilled in the art to which it appertains to make and use the same.

This invention relates to potato planters.

The object of the invention resides in the provision of a potato planter embodying an improved construction whereby the efficiency, reliability and simplicity of the machine is enhanced.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a plan view of a potato planter constructed in accordance with the invention; Fig. 2, a side view of the planter with the near wheel removed; Fig. 3, a longitudinal section of the planter; Fig. 4, a partial rear view of the planter; Fig. 5, a section on the line 5—5 of Fig. 1; Fig. 6, a detail perspective view disclosing one of the trip arms carried by the rotary feed wheel; Fig. 7, a fragmental perspective view of the cutting box, and Fig. 8, a detail view disclosing the tripping lugs carried by the shoe for actuating the tripping arms carried by the rotary feed wheel.

Referring to the drawings the improved potato planter is shown as comprising an axle 10 upon which are mounted traction wheels 11 and 12. The axle 10 is provided with a plurality of transverse passages 13, while the hub of the wheel 12 is provided with a transverse passage 14 adapted to be selectively brought into registration with the passages 13 to permit a cotter pin 15 being passed through registering passages 13 and 14. In this manner the wheel 12 may be adjusted toward and away from the wheel 11 and the active width of the machine varied to meet different conditions. Rotatably mounted on the axle 10 are sleeves 16 and 17 to which are secured the side members 18 respectively of a frame A. Journaled in the forward end of the side members 18 is a shaft 19 provided with a central crank portion 20 rotatably mounted in a bearing 21 carried by a draft tongue 22. The end of the shaft 19 adjacent the wheel 11 is provided with a laterally directed portion 23. Fixed on the end of the shaft 19 adjacent the wheel 12 is a lever 24 carrying a spring pawl 25 adapted to coöperate with a toothed segment 26 mounted on the side member 18 adjacent the lever 24. Mounted between the forward ends of the member 19 is a shoe 27 including a tubular vertical stem 28 provided with a longitudinal slot 29 in its rear for a purpose that will presently appear. The stem 28 is provided on each side of the slot 29 adjacent the top of the stem with inwardly directed lugs 30. Mounted on the outer side of the stem 28 adjacent the lower end thereof are oppositely disposed lateral studs 31. Depending from the tongue 22 is a bracket 32 to which the forward end of the shoe 27 is pivoted. Also pivoted to the bracket 32 is a bar 33 one end of which is forked to form arms 34 disposed in embracing relation to the stem 28 and between which are journaled cultivating disks 35.

Fixed on the axle 10 adjacent the outer end of the sleeve 16 is a collar 36 provided with teeth 37. Splined upon the axle 10 between the collar 36 and wheel 11 is a sleeve 38 having its inner end provided with teeth 39 adapted to coöperate with the teeth 37 to connect the sleeve 38 to the axle 10 as will be obvious. The sleeve 38 is provided with spaced circumferential flanges 40 between which is engaged a yoke 41 formed on the end of a rod 42 slidably mounted in a bearing 43 for movement transversely of the machine. Rotatably mounted in a bearing 44 on the frame A and in a bracket 45 carried by said frame is a longitudinal shaft 46. The forward end of this shaft is provided with a lateral arm 47 adapted to be engaged by the laterally directed portion 23 of the shaft 19 when the latter is rotated under the influence of the forward movement of the lever 24. The shaft 46 is provided adjacent its inner end with an arm 48 which is pivotally connected with the adjacent end of the rod 42. Splined upon the axle 10 is a sleeve 49 provided on its inner end with teeth 50. This sleeve 49 is provided with spaced circumferential flanges 51 between which is engaged a yoke 52 formed on the inner end of the shaft 46. Loosely mounted upon the axle 10 centrally of the latter is a hub 53 carrying a plurality of arms 54 for a purpose that will presently appear. The end of the hub 53 adjacent the sleeve 49 is provided with teeth 54′ adapted to coöperate with the teeth 50 on said sleeve 49. A spring 55 encircles the axle 10 and has one end bearing against the sleeve 49 and its other end bearing against the sleeve 16, said spring constantly tending to move the sleeve 49 toward the hub 53 as will be obvious. By this construction it will be obvious that when the lever 24 is moved to the rear the forward end of the frame A and the shoe 27 will be lowered into operative position. When the shoe is thus disposed the spring 55 will operate the sleeve 49 to engage the teeth 50 with the teeth 54′. The engagement of the flanges 51 with the yoke 52 will rotate the shaft 46 and this rotation of said shaft will slide the rod 42 transversely of the machine and engage the teeth 39 with the teeth 37 and thus the entire machine is thrown into operation. When the lever 24 is moved forwardly the forward end of the frame A and the shoe 27 will be raised and during the elevation of the frame and shoe the stud 31 will engage the arms 34 and in this way the disk 35 will be in turn elevated. During the rotation of the shaft 19 under the influence of the forward movement of the lever 24 the portion 23 of said shaft will engage the arm 47 and rotate the shaft 46 in a direction to disengage the teeth 39 and 50 from the teeth 37 and 54′ respectively and thus throw the machine out of gear.

Mounted upon the rear end of the frame A is a casing 56 having an open forward end across which extend knives 57 arranged parallel and at right angles to each other. These knives are normally held against the forward end of the casing 56 by means of spring mechanisms 58. Slidable in the casing 56 is a plunger 59 the forward end of which is grooved as at 60 to receive the knives 57 at the termination of the forward stroke of said plunger. Rotatably mounted on the rear of the frame A is a transverse shaft 61 provided with a crank portion 62 which is connected to the plunger 59 by a connecting rod 63. Mounted upon the casing 56 is a supply hopper 64 and rotatably mounted in the forward portion of this hopper are upper and lower transverse shafts 65 and 66 respectively.

Fixed on the shafts 65 and 66 respectively are sprocket wheels 67 and traveling on these sprocket wheels is a bucket conveyer 68. Fixed on the shaft 61 is a sprocket wheel 69 which alines with a sprocket wheel 70 fixed on the shaft 65 and traveling on the sprocket wheels 69 and 70 is a sprocket chain 71. Also fixed on the shaft 61 is a sprocket wheel 72 which alines with a sprocket wheel 73 fixed on the sleeve 38 and traveling on the sprocket wheels 72 and 73 is a sprocket chain 74. Disposed within the hopper 64 is a guide plate 75 which serves to seat the potatoes in the buckets of the conveyer 68 during the operation of the latter. Rising from the forward end of the casing 56 is a guide plate 76 serving to direct the potatoes into the forward end of the casing 56 as they are discharged from the conveyer 68. The potatoes are delivered into the casing 56 in advance of the plunger 59 so that upon the next forward stroke of the plunger the potatoes will be severed by the knives 57 and ejected from between said knives by the plunger 59 owing to the presence of the grooves 60.

Supported by the frame A in position to receive the severed potatoes from the knives 57 is a hopper 77 having a slot 78 in its front wall through which the arms 54 travel. Pivoted within the hopper 77 are coöperating friction plates 78 moved toward each other by spring devices 79 and yieldingly held against rearward movement by a spring device 80. The free ends of the arms 54 are provided respectively with prongs 81 which are adapted to enter single pieces of potatoes for the purpose of transferring same from the hopper 77 to the stem 28 of the shoe 27. Pivoted on each arm 54 is a stripping member 82 one end of which is adapted to engage the lugs 30 for the purpose of swinging same the length of the adjacent prong 81 to disengage the potato from said prong as will be obvious. This disengagement of the potato from the prong is effected just as the prong enters the upper end of the stem 28, it being noted that the arms 54 travel in the slot 29. During the passage of the arms 54 through the hopper 77 the prongs will travel between the plates 78 and the piece of potato in advance of the prong will friction on the plates so as to offer sufficient resistance to effect engagement of the prongs therein.

What is claimed is:—

In a potato planter the combination of a wheeled frame, a hopper mounted on the frame, a rotary feed wheel including radial arms movable through the hopper, forks on the ends of said arms for engaging the potato parts when moving through the hopper, a stripping frame pivoted to each arm and adapted when moved in one direction to strip the potato part from the related fork, a shoe provided with a slot through which the arms pass during rotation of the feed wheel, and projections extending into said slot and engaging the stripping frames to impart stripping movement to the latter.

In testimony whereof I affix my signature, in the presence of two witnesses.

FRANK J. GOSMEYER

Witnesses:
H. KILIAN,
F. STANGL.